July 12, 1949.  E. F. IWANSKI  2,475,897

AUTOMOBILE COOLING APPARATUS

Filed Sept. 14, 1945

INVENTOR
EMIL F. IWANSKI,

BY
ATTORNEYS

Patented July 12, 1949

2,475,897

UNITED STATES PATENT OFFICE 2,475,897

AUTOMOBILE COOLING APPARATUS

Emil F. Iwanski, Chicago, Ill.

Application September 14, 1945, Serial No. 616,224

2 Claims. (Cl. 62—117)

The present invention relates to air-conditioning and cooling apparatus for motor vehicles and is more particularly concerned with apparatus of this character that is adapted to be installed in combination with the usual internal combustion engine wherein the compressor may be driven by the fan belt of the engine and controlled by a clutch positioned between the fan belt and compressor with the clutch actuated from the instrument board of the vehicle.

Air-cooling units for motor vehicles are well known, but the complexity of such units renders their use limited. However, the device of the invention is comparatively simple and comprises a compressor unit closely associated with and deriving its power from the engine of the vehicle, and an evaporator or cooling unit positioned in the passenger compartment of the vehicle below the instrument panel.

The primary object of the invention is to provide cooling and air conditioning apparatus for the purpose named which is controlled by thermostat whereby, it can be regulated to provide the desired temperature or the speed of the fan of the cooling system can be regulated by means of the thermostat control.

Another object of the invention is to provide apparatus of the character mentioned which includes stale or foul air exhaust means, operated by motor and controlled from the instrument panel.

A further object of the invention is to provide cooling and air-conditioning apparatus for the purpose mentioned, of simpler and more compact construction than that disclosed in prior devices.

With the foregoing and other objects and advantages in view, the invention consists of the novel construction and arrangement of parts hereinafter described and claimed.

In the accompanying drawings illustrating the invention,

Like numerals in the description and drawings designate the same parts of construction.

1 is the cowl, 2 the engine, 3 the dash, 4 the instrument panel and 5 the floor of an automobile.

Figure 2:
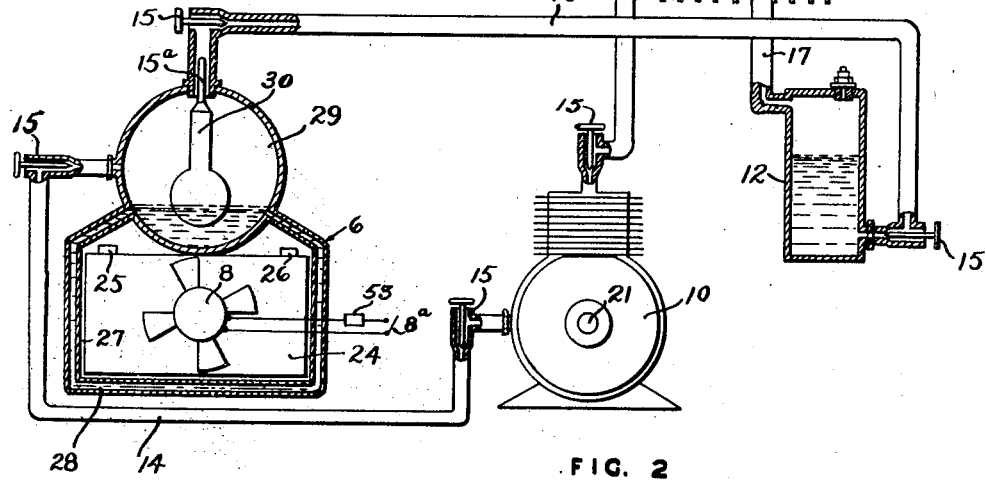
Figure 2 is a schematic view of the apparatus, showing interrelation of the components.

A cooling unit 6 which is enclosed in a suitable housing, not shown, is mounted on the dash 3 inwardly of the passenger compartment of the automobile. The cooling unit 6 as best seen in Figure 2, comprises a substantially annular refrigerant chamber 28 which incloses a removable water tank 24. The upper ends of the chamber 28 are in open communication with a tank 29 in which the liquid refrigerant is evaporated to cool the tank 24 in a well known manner. The housing for the cooling unit 6 is in open communication with a ventilator conduit 50 leading to the usual cowl ventilator 9 on the engine hood 1. A fan 8 in the housing forces air from the conduit 50 over and around the water tank 24 through the spaces 27 therearound and into the interior of the passanger compartment through any suitable louvres 51.

Liquid refrigerant is supplied to the cooling unit 6 from a sealed-in compressor-condenser unit located in the engine compartment of the vehicle adjacent the engine 2. Such compressor condenser unit comprises a conventional compressor 10 which is operated from the fan belt 20 of the motor 2. The compressor 10 receives low-pressure refrigerant gas from the evaporator tank 29 through a conduit 14. Valves 15 control opposite ends of the conduit 14 whereby to shut off the flow of low-pressure gas at either end of the conduit as desired. The output side of the compressor 10 is connected by a conduit 18 to a condenser coil 16 which includes the usual fins 7. The opposite end of the condenser coil 16 is connected to a receiver tank 12 by a conduit 17. The condensed refrigerant flows from the receiver tank 12 to the evaporator tank 29 by a return conduit 13. Valves 15 control opposite ends of the conduit 13. Likewise, a float valve 15a controlled by a float 30 opens and controls the evaporator end of the conduit 13 in accordance with the height of liquid refrigerant in the tank 29. Any suitable fan 52 may be operatively associated with the condenser coil 16 to circulate air therethrough to condense the high-pressure refrigerant to liquid refrigerant for passage into the receiver tank 12. Any suitable refrigerant may be used, such as sulphur-dioxide ($SO_2$).

In operation, low-pressure refrigerant gas passes through the conduit 14 to the input side of the compressor 10 and is there compressed to high pressure refrigerant gas which passes through the conduit 18 to the condensing coil 17 where it is condensed into high-pressure refrigerant liquid and passes to the receiver tank 12. From the receiver tank 12, the high-pressure refrigerant liquid passes through the conduit 13 to the evaporator tank 29 where it is evaporated in a well known manner to cool the water tank 24 and the air forced through the annular chamber 28 by the fan 8.

Figure 1:
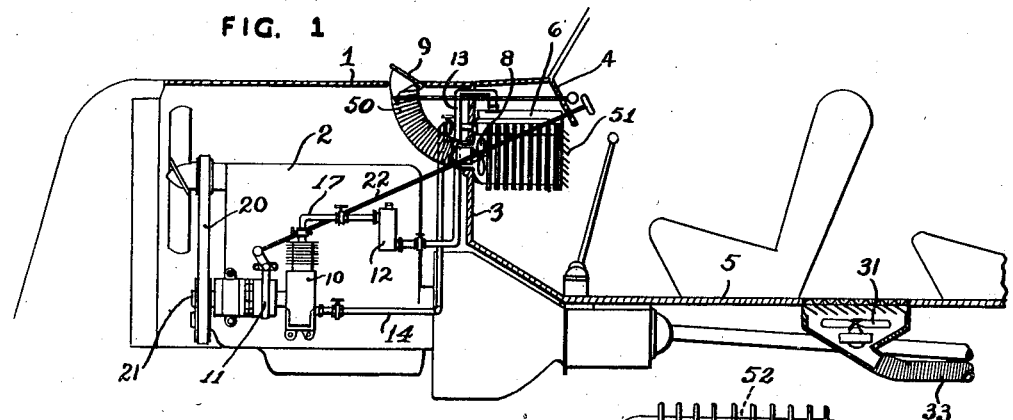
Figure 1 is a slide elevation of the forward part of a motor vehicle, partly in section, showing the elements of the apparatus installed therein.

To control the operation of the device, there is provided a clutch-actuating rod 22 which extends from the clutch 11 through the engine compartment to a point above the dashboard 4. The free end of the rod 22 is provided with any suitable actuating knob, as shown in Figure 1. Actuation of the fan 8 is controlled by any suitable well known form of rheostat switch 8a, Figure 2, the operation of which may be controlled by a thermostat 53 located in the passenger compartment of the vehicle. The water tank 24 is provided with an air vent 25 and a filling port 26 on the upper surface thereof.

To vent stale air from the passenger compartment of the vehicle, there has been provided an exhaust conduit 33 located at any suitable point, as in the floor 5 of the vehicle. Any suitable fan 31 is utilized to draw stale air out of the passenger compartment and discharge the same through the conduit 33.

While I have shown and described what is now thought to be a preferred embodiment of the invention, it is to be understood than the same is susceptible of other forms and expressions. Consequently, I do not limit myself to the precise structure shown and described hereinabove except as hereinafter claimed.

Having thus described my invention, what I claim as new and desire to secure by Letters Patent, is:

1. In a cooling system for motor vehicles, including a cooling coil disposed in the passenger compartment and means for cooling said coil, the improvement comprising a water tank mounted in said coil axially thereof and in spaced relation thereto, said tank having an open air vent, and means for passing outside air through said coil and over said tank to cool and condition said air.

2. In a cooling system for motor vehicles, including a cooling coil disposed in the passenger compartment and means for cooling said coil, the improvement comprising a removable water tank mounted in said coil axially thereof and in spaced relation thereto, said tank having an open air vent, and means for passing outside air through said coil and over said tank to cool and condition said air.

EMIL F. IWANSKI.

REFERENCES CITED

The following references are of record in the file of this patent:

UNITED STATES PATENTS

| Number | Name | Date |
|---|---|---|
| 1,913,273 | Hammers et al. | June 6, 1933 |
| 2,088,753 | Lanctot et al. | Aug. 3, 1937 |